United States Patent [19]
Niimura

[11] Patent Number: 5,902,668
[45] Date of Patent: May 11, 1999

[54] STRUCTURE OF CARD MEDIUM HAVING EMBOSSED PATTERNS AND METHOD OF MANUFACTURING THE SAME

[75] Inventor: Yuuji Niimura, Tokyo, Japan

[73] Assignee: Oki Electric Industry Co., Ltd., Tokyo, Japan

[21] Appl. No.: 08/768,391

[22] Filed: Dec. 18, 1996

[30] Foreign Application Priority Data

Jan. 10, 1996 [JP] Japan ................................... 8-001843

[51] Int. Cl.⁶ ....................................................... B32B 3/00
[52] U.S. Cl. ........................... 428/195; 428/916; 427/147; 156/219
[58] Field of Search ................................ 428/411.1, 916, 428/195, 173, 200, 202, 204; 156/230, 247, 219; 427/147

[56] References Cited

U.S. PATENT DOCUMENTS

| | | | |
|---|---|---|---|
| 4,714,656 | 12/1987 | Bradshaw et al. | 428/411.1 |
| 4,997,707 | 3/1991 | Otawa et al. | 428/319 |
| 5,413,838 | 5/1995 | Chartwin et al. | 428/195 |
| 5,591,527 | 1/1997 | Lu | 428/411.1 |

FOREIGN PATENT DOCUMENTS

| | | |
|---|---|---|
| 54-6062 | 1/1979 | Japan . |
| 55-79110 | 6/1980 | Japan . |
| 5-329437 | 12/1993 | Japan . |

*Primary Examiner*—Elizabeth Evans
*Attorney, Agent, or Firm*—Wenderoth, Lind & Ponack, L.L.P.

[57] ABSTRACT

A card medium having embossed patterns, which is capable of preventing forgery of the embossed patterns by charging a resin into each of concave portions defined in the back of the card medium according to the embossing of the patterns or affixing a film for covering a concave-portion region to the back thereof.

17 Claims, 6 Drawing Sheets

STRUCTURE OF CARD MEDIUM HAVING EMBOSSED PATTERNS AND METHOD OF MANUFACTURING THE SAME

BACKGROUND OF THE INVENTION

1. Field of the Invention

This invention relates to a card medium having patterns such as embossed characters, numerics and symbols or the like, and particularly to a structure for preventing forgery of patterns embossed on the card medium and a method of manufacturing the structure.

2. Description of the Related Art

There has recently been an increasing tendency to use cards for payment and withdrawal of money to and from a bank, for the purchase of goods and for identification of an employee. Various types of such cards are known. As examples, a card capable of magnetically recording information therein and a card equipped with an integrated circuit having a memory and capable of allowing the memory to store information therein are known. Such information is generally used as information to be kept secret from those other than the card owners in most cases. To the contrary, information that may be known by those other than the card owners, is also included therein. For instance, the names of the card owners themselves and identification numbers such as account numbers individually applied to card owners by an agency that has issued cards thereto, are included in the information. Such information may preferably be set such that when a card owner has lost or dropped his or her card, a card finder can immediately confirm to which person the card belongs. Therefore, embossed patterns are provided on a card so that such information can be confirmed from the external appearance of the card. The patterns are comprised of a plurality of characters, numerics and symbols or combinations of these because of the names or identification numbers referred to above.

However, there may be cases where the patterns embossed on the card are imitated or forged or put to a bad use. There is therefore a demand for improving a technique for preventing card forgery. The embossed patterns are easy to be forged. Forgery is realized by, for example, pressing a card having embossed patterns so as to flatten the front and back of the card and thereafter embossing desired patterns therein.

Further, the embossed patterns can be simply provided on the card using molds or the like by a card issue agency. Thus, since the embossed patterns are easily formed, the application of complex processes for prevention of forgery of the embossed patterns is at variance with the reality.

SUMMARY OF THE INVENTION

With the foregoing in view, it is an object of the present invention to provide a structure of a card for preventing forgery of embossed patterns formed on the card.

It is another object of the present invention to provide a manufacturing method of easily realizing the card having the above-described structure.

According to one aspect of the present invention, for achieving the above objects, there is provided a card medium having embossed patterns including a plurality of concave portions formed in the back of the card medium according to the embossing of the patterns and a resin charged into each concave portion.

According to another aspect of the present invention, for achieving the above objects, there is provided a method of embossing patterns on a card medium, comprising the following steps:

a step for disposing the card medium between a concave mold corresponding to the patterns and a convex mold disposed in an opposing relationship to the concave mold and interposing the card medium between the concave and convex molds; and a step for charging a resin into each of the concave portions defined in the card medium by the embossing.

According to a further aspect of the present invention, for achieving the above objects, there is provided a card medium having embossed patterns including a plurality of concave portions formed in the back of the card medium according to the embossing of the patterns and a film placed so as to cover at least the concave portions defined in the back of the card medium.

Here, typical examples, of the inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects, features and advantages thereof will be better understood from the following description taken in connection with the accompanying drawings in which:

DETAILED DESCRIPTION OF THE PREFERRED EMBODIMENTS

The present invention will hereinafter be described in detail with reference to the accompanying drawings.

Figure 1:
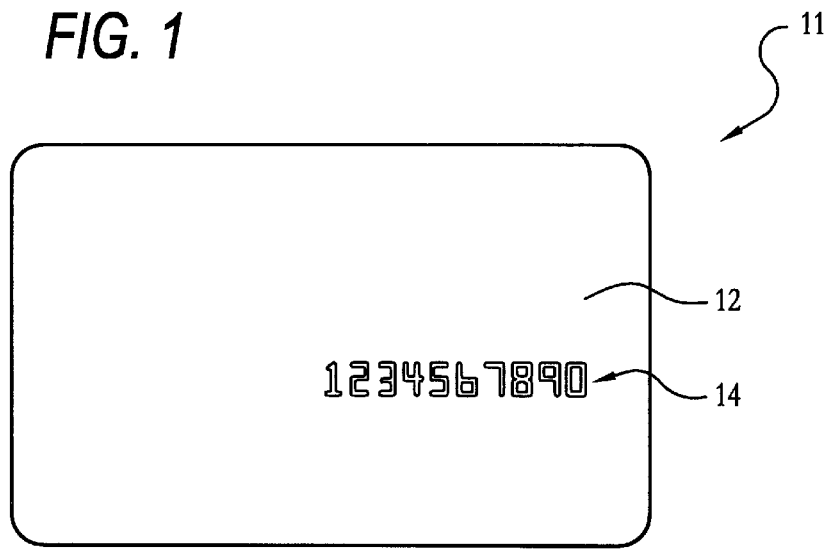
FIG. 1 is a view showing the front surface of a card 11 having embossed patterns, which is illustrative of a first embodiment of the present invention.
Figure 2:
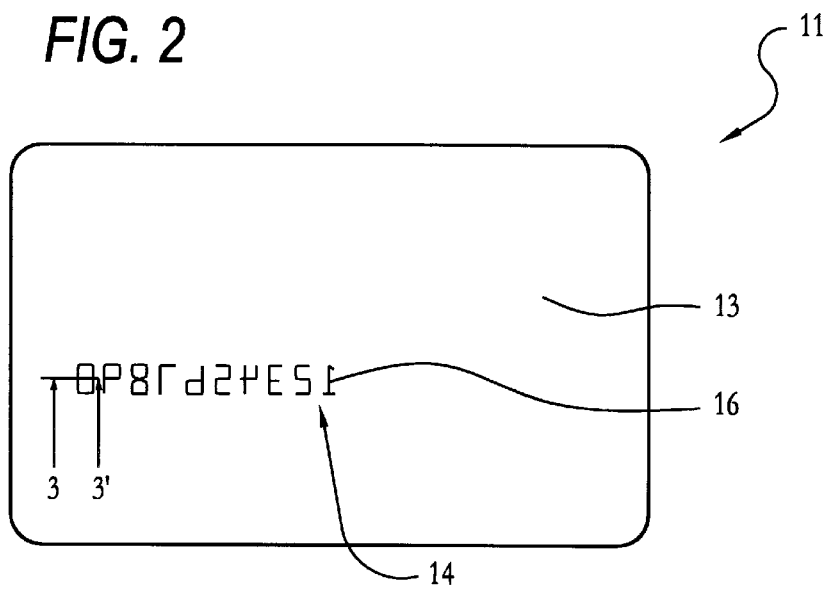
FIG. 2 is a view showing the back of the card 11 shown in FIG. 1.
Figure 3:
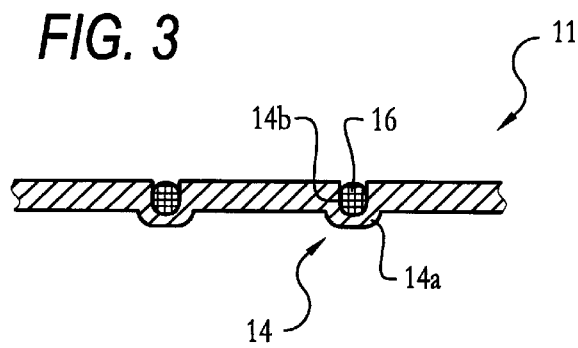
FIG. 3 is a cross-sectional view taken along line 3—3 of FIG. 2.

FIGS. 1 through 3 show a first embodiment of the present invention.

FIG. 1 is a view for explaining the front or front surface of a card 11 having embossed patterns, which shows the first embodiment of the present invention. FIG. 2 is a view for describing the back or reverse side of the card 11. Although not shown in FIGS. 1 and 2, the card 11 may have means for magnetically recording information therein or means such as an integrated circuit having a memory, for recording information therein. However, the information recording means will be formed within a region other than a region in which embossed patterns to be described later are formed.

Referring to FIG. 1, embossed patterns 14 are formed on the front surface 12 of the card 11. Numeric characters are formed as the patterns 14 in FIG. 1. The patterns 14 on the front surface 12 are shaped in convex form i.e., the patterns protrude from the front surface. In FIG. 2, portions corresponding to the embossed patterns 14 on the back 13 of the card 11 are shaped in concave form. The concave-shaped portions defined in the reverse side 13 are respectively filled with a resin 16.

FIG. 3 is a cross-sectional view taken along line 3—3 of FIG. 2. Referring to FIG. 3, a structure having the above-described patterns is distinctly shown. The patterns 14 are formed as convex portions 14a on the front surface 12 side and are formed as concave portions 14b on the back 13 side. Further, the resin 16 is charged, i.e., filled into the concave portions 14b. Various materials are available as the resin 16. Particularly, the use of a thermosetting or thermochromic resin can more effectively prevent forgery. This will be descried below in detail.

Now consider that when one attempts to counterfeit the patterns 14 embossed on the card 11 constructed in the above-described manner, the card 11 is pressed to flatten the front and back of the card 11. At this time, the resin charged into each concave portion 14b is pressed or pushed out onto the front surface 12 of the card 11 and rendered flat on the front surface 12 thereof. Thereafter, even if desired patterns are embossed and formed on the card 11, no resin is charged into concave portions 14b defined by newly-formed patterns. Further, even if the resin 16 is newly charged, each flattened resin 16 remains on the front surface 12 of the card 11. Thus, whether or not the card 11 has been forged, can be found out by confirming the state of the resin 16 in a region for forming the embossed patterns 14 of the card 11. A press process for forging the embossed patterns 14 of the card 11 is often carried out under the normal heated state. Thus, if the thermosetting resin is used as the resin 16, then the resin 16 is hardened upon the press process for flattening the card 11. Therefore, even if the press process is effected on the card 11, the hardened resin 16 is not flattened and put into the card 11 side. Accordingly, the front surface 12 of the card 11, which has the convex portions 14a, are rendered flat. However, in the reverse side 13 having the concave portions 14b filled with the resin 16, the resin 16 remains charged into the concave portions 14b. Thereafter, even if the desired patterns 14 are embossed and formed on the card 11 and the concave portions 14b associated with the patterns 14 are filled with the resin 16, the resin 16 remains within a region other than a region for newly-formed patterns 14. Thus, whether or not the card 11 has been forged, can be immediately found out by confirming the state of the back 13 of the card 11. In this case, the strength of the card 11 must be lower than that of the hardened resin in a heated state at press processing. Similarly, if the thermochromic resin is used as the resin 16, then the resin 16 is discolored upon the press process for flattening the card 11. Thereafter, even if one attempts to forge or imitate the embossed patterns, the discolored resin 16 remains in a state of being flattened on the reverse side 13 of the card 11. It is therefore possible to immediately detect or find out whether the card 11 has been imitated.

A method of manufacturing the card 11 will next be described in detail with reference to FIG. 4.

Figure 4A:
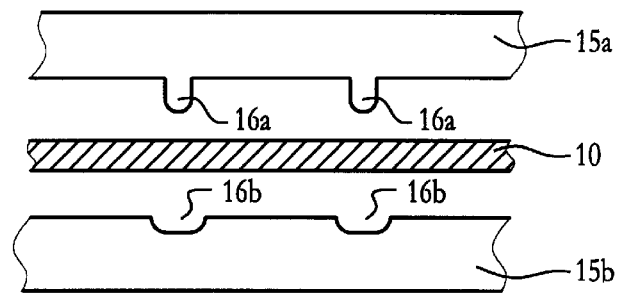
FIGS. 4A–4D are views for describing a first manufacturing method which corresponds to a method of manufacturing the card 11 shown in FIG. 1.
Figure 4B:
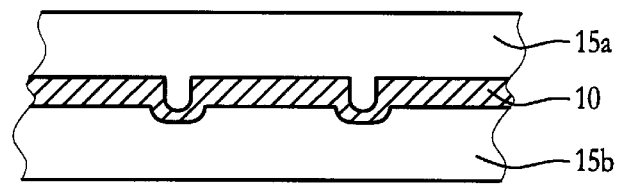
Figure 4C:
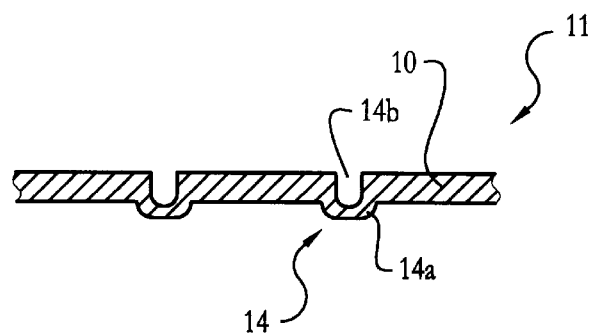
Figure 4D:
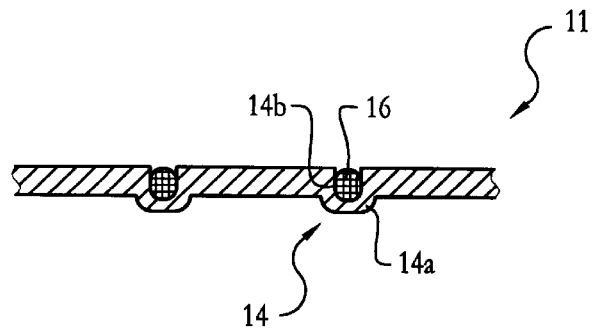

As shown in FIG. 4A, a card base material 10 to be subjected to an embossing process is first disposed between a convex mold 15a and a concave mold 15b corresponding to desired patterns to be formed by embossing. Convex portions 16a of the convex mold 15a are respectively opposed to concave portions 16b of the concave mold 15b. Further, a region for the card base material 10, which is to be embossed, is provided between the convex portions 16a and the concave portions 16b. Next, the card base material 10 is interposed between the convex mold 15a and the concave mold 15b as shown in FIG. 4B. After completion of this sandwich processing, the card base material 10 is withdrawn from between the convex mold 15a and the concave mold 15b. Thus, patterns 14 embossed in the desired region are formed in the card base material 10 as shown in FIG. 4C. Consequently, the card 11 is substantially formed. Convex portions 14a are formed on the front surface 12 of the so-formed card 11, whereas concave portions 14b are formed in the reverse side 13 thereof. Next, a resin 16 is charged into each of the concave portions 14b of the back 13 of the card 11 as shown in FIG. 4D. Thus, the fabrication of the card 11 is completed.

Thus, the process of charging the resin 16, which is shown in FIG. 4D, simply increases as the process of manufacturing the card 11. Accordingly, the card 11 having a forgery-preventive structure can be realized in accordance with an easy manufacturing process.

Figure 5A:
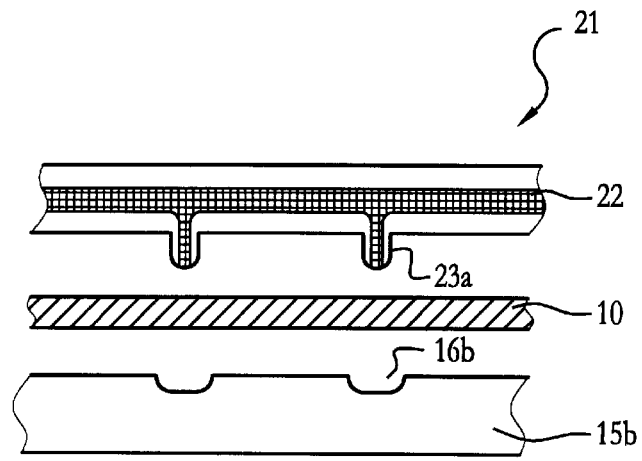
FIGS. 5A–5C are views for describing a second manufacturing method which corresponds to another method of manufacturing the card 11 shown in FIG. 1.
Figure 5B:
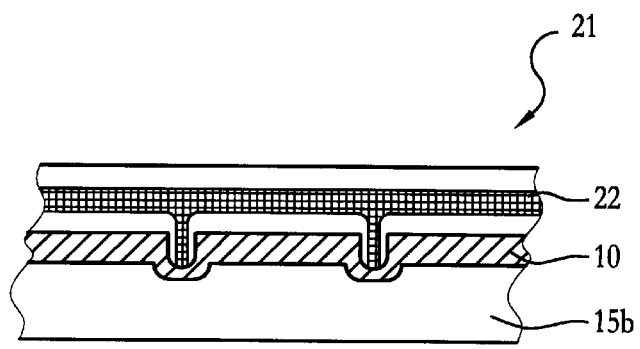
Figure 5C:
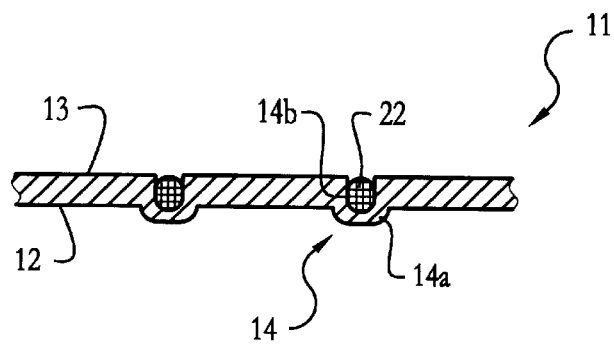
Figure 6A:
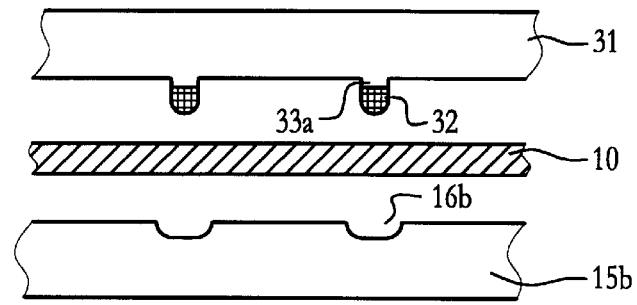
FIGS. 6A–6C are views for describing a third manufacturing method which corresponds to a further method of manufacturing the card 11 shown in FIG. 1.
Figure 6B:
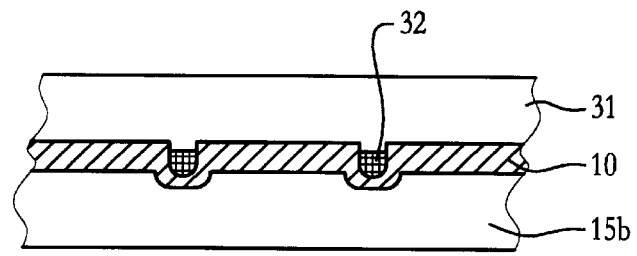
Figure 6C:
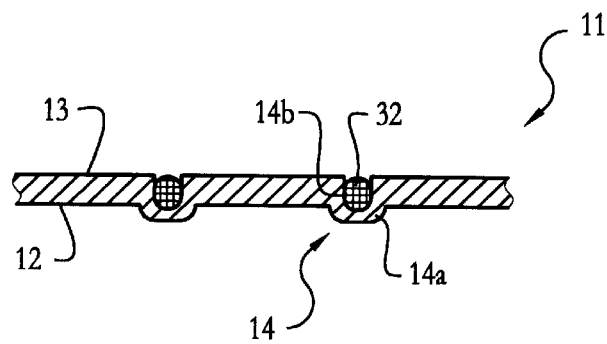

Further, a second manufacturing method shown in FIGS. 5A–5C or a third manufacturing method shown in FIGS. 6A–6C may be used as the method of manufacturing the card 11. The second and third manufacturing methods will be described below. Incidentally, the same elements of structure as those employed in the manufacturing method shown in FIGS. 4A–4D are identified by the same reference numerals.

Referring to FIGS. 5A–5C showing the second manufacturing method, a card base material 10 is first disposed between a convex mold 21 and a concave mold 15b as shown in FIG. 5A. A channel along which a resin 22 flows, is formed inside the convex mold 21. This channel has openings defined in leading end portions of convex portions 23a. Thus, the resin 22, which flows along the channel, can be discharged out of the leading end portions of the convex portions 23a. Further, the convex portions 23a of the convex mold 21 are respectively opposed to concave portions 16b of the concave mold 15b. A region for the card base material 10, which is to be embossed, is provided between the convex portions 23a and the concave portions 16b. Next, the card base material 10 is sandwiched between the convex mold 21 and the concave mold 15b as shown in FIG. 5B. Upon this sandwich processing, the resin 22 is discharged out of the leading end portion of each convex portion 23a. Timing for discharging the resin 22 may be provided simultaneously with the releasing of interposition of the card base material 10 between the convex mold 21 and the concave mold 15b subsequent to completion of the interposition of the card base material 10 therebetween. This is because since the convex portions 23a of the convex mold 21 are inserted into spaces defined within the concave portions 14b formed in the card base material 10 when the card base material 10 is in a state of being interposed between the two molds, the resin 22 is hard to be charged into each concave portion 14b. After completion of this interposing process, the card base material 10 is withdrawn from between the convex mold 21 and the concave mold 15b. Thus, patterns 14 embossed on a desired region of the card base material 10 are formed on the case base material 10 as shown in FIG. 5C. The card 11 is substantially formed in this way. Further, convex portions 14a are formed on the front surface 12 of the card 11 formed with the patterns 14 and the concave portions 14b are formed in the reverse side 13 thereof. Moreover, the resin 22 is charged into each concave portion 14b defined in the back 13 of the card 11. Thus, the fabrication of the card 11 is terminated.

Referring to FIGS. 6A–6C showing the third manufacturing method, a card base material 10 is first disposed between a convex mold 31 and a concave mold 15b as shown in FIG. 6A. A leading end portion of each convex portion 33a of the convex mold 31 is formed of a resin 32. The convex portions 33a of the convex mold 31 are respectively opposed to concave portions 16b of the concave mold 15b. A region for the card base material 10, which is to be subjected to an embossing process, is provided between the convex portions 33a and the concave portions 16b. Next, the card base material 10 is interposed between the convex mold 31 and the concave mold 15b as shown in FIG. 6B. Upon this interposing process, the resin 32 is taken off from the leading end portion of each convex portion 33a. Timing for taking off the resin 32 may be provided simultaneously with the release of interposition of the card base material 10 between the convex mold 31 and the concave mold 15b subsequent to completion of the interposition of the card base material 10 between the convex mold 31 and the concave mold 15b. When this is made simultaneously with the interposition of the card base material 10 between the two molds, the formation of patterns 14 by embossing might be imperfect. In order to remove or take off the resin 32, for example, a resin 32 such as a material tight or strong in adhesion to the card base material 10 as compared with the adhesion to a material for the convex mold 31 is used. With the release of interposition of the card base material 10 between the molds 31 and 15b, the resin 32 can be left within each concave portion 14b formed in the card base material 10. Further, if the mold 31 is released in a slanting direction, it is then easier to leave the resin 32 behind. After completion of this interposing process, the card base material 10 is withdrawn from between the convex mold 31 and the concave mold 15b. Thus, the patterns 14 embossed on a desired region of the card base material 10 are formed on the card base material 10 as shown in FIG. 6C. As a result, the card 11 is substantially formed.

Further, convex portions 14a are formed on the front surface 12 of the card 11 formed with the patterns 14, whereas concave portions 14b are formed in the reverse side 13 thereof. Moreover, the resin 32 is charged into each concave portion 14b formed in the reverse side 13 of the card 11. The fabrication of the card 11 is completed in this way.

According to the second and third manufacturing methods as described above, the resin charging process can be performed with the execution of the interposing process. Thus, the card 11 having a forgery-preventive structure can be realized in accordance with an easy manufacturing process and the number of manufacturing processes can be reduced.

When a thermosetting resin is used as the resin 32 to be charged into the card 11 in the first through third manufacturing methods, the resin 32 may be hardened by heating the card 11 after completion of the respective processes shown in FIG. 4D, FIG. 5C and FIG. 6C. If done so, then an advantageous effect can be obtained when the above-described thermosetting resin is used even if the press process to be executed upon forgery is not placed under a heated state.

Figure 7:
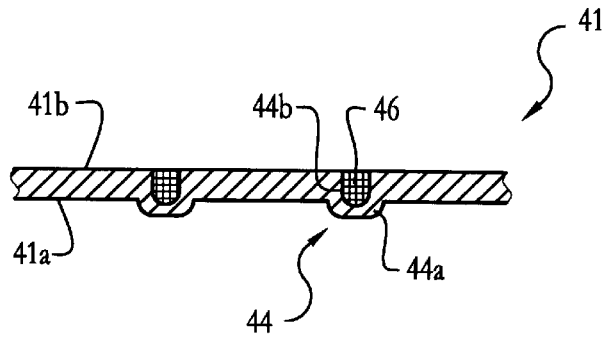
FIG. 7 is a cross-sectional view illustrating a card 41 according to a second embodiment of the present invention.

A second embodiment of the present invention will next be described. FIG. 7 is a view showing the second embodiment of the present invention. FIG. 7 is a cross-sectional view of the second embodiment, which indicates the same portion as the portion indicated by the cross-sectional view taken along line 3—3 of FIG. 2.

Referring to FIG. 7, embossed patterns 44 are formed on the front surface 41a side of a card 41 as convex portions 44a and formed as concave portions 44b on the reverse side 41b side thereof. Further, a resin 46 is charged into each concave portion 44b. Various resins are available as the resin. Particularly, as described above, the use of the thermosetting or thermochromic resin can more effectively prevent forgery. Further, the upper surface of the resin 46 charged into each convex portion 44b is made flush with the back 41b. Namely, the reverse side 41b is flattened by filling each concave portion 44a with the resin 46.

Thus, the same advantageous effect as that obtained in the first embodiment can be obtained. Further, since the reverse side is made flat owing to the construction of the second embodiment, the degree of freedom such as printing on the reverse side, affixing of a sign panel thereto, can be increased.

A method of manufacturing the card 41 according to the second embodiment will next be described in detail with reference to FIGS. 8A–8E.

Figure 8A:
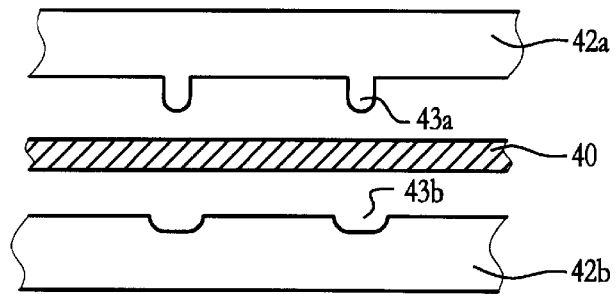
FIGS. 8A–8E are views for describing a method of manufacturing the card 41 shown in FIG. 7.
Figure 8B:
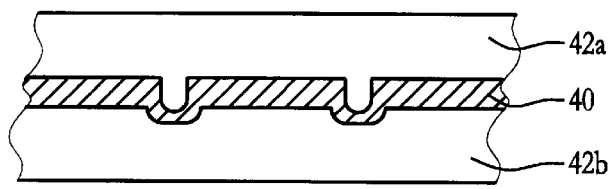
Figure 8C:
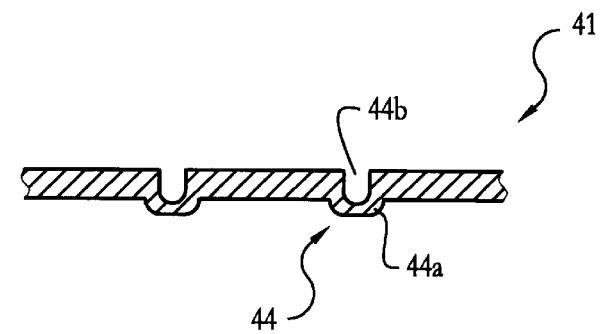
Figure 8D:
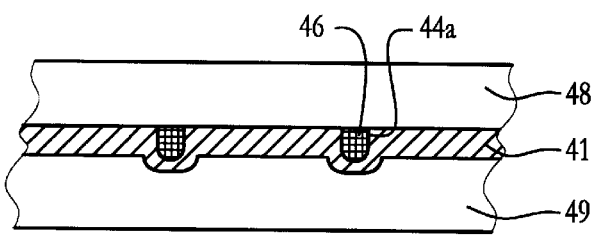
Figure 8E:
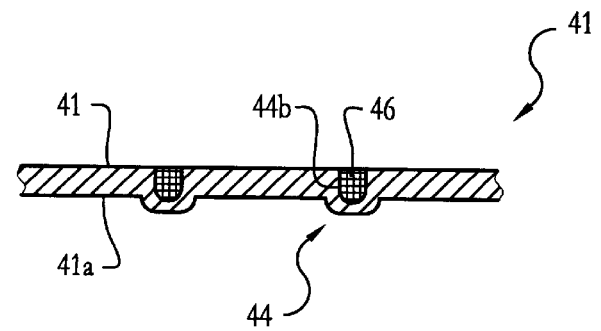

As shown in FIG. 8A, a card base material 40 to be embossed is first placed between a convex mold 42a and a concave mold 42b corresponding to desired patterns to be formed by embossing. At this time, convex portions 43a of the convex mold 42a are respectively opposed to concave portions 43b of the concave mold 42b. Further, a region for the card base material 40, which is to be embossed, is provided between the convex portions 43a and the concave portions 43b. Next, the card base material 40 is interposed between the convex mold 42a and the concave mold 42b as shown in FIG. 8B. After completion of this interposing process, the card base material 40 is taken out from between the convex mold 42a and the concave mold 42b. Thus, patterns 44 embossed to the desired region of the card base material 40 are formed in the card base material 40. Convex portions 44a are formed on the front surface 41a of the card 41 formed in this way and concave portions 44b are formed in the reverse side 41b thereof. Next, the card 41 is placed between an upper mold 48 and a lower mold 49 so as to be interposed therebetween as shown in FIG. 8D. The upper mold 48 is a mold having a flat surface. In this case, a resin 46 equal in capacity to each concave portion 44b formed in the card 41 is charged into each concave portion 44b. After completion of this interposing process, the card base material 40 is withdrawn from between the upper mold 48 and the lower mold 49. Thus, as shown in FIG. 8E, the resin 46 is charged into each concave portion 44b of the card base material 40 so that the reverse side 41b is made flat. As a result, the fabrication of the card 41 is completed.

Figure 9:
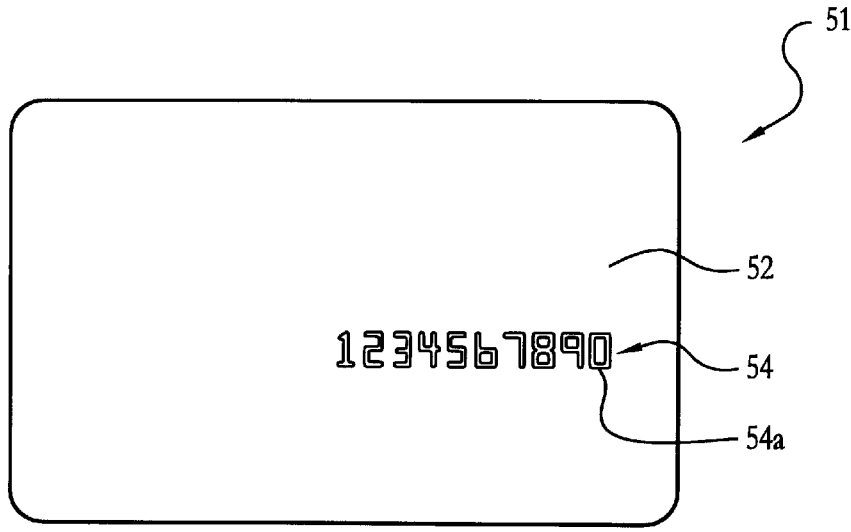
FIG. 9 is a view for describing the front surface of a card 51 having embossed patterns, which is illustrative of a third embodiment of the present invention.
Figure 10:
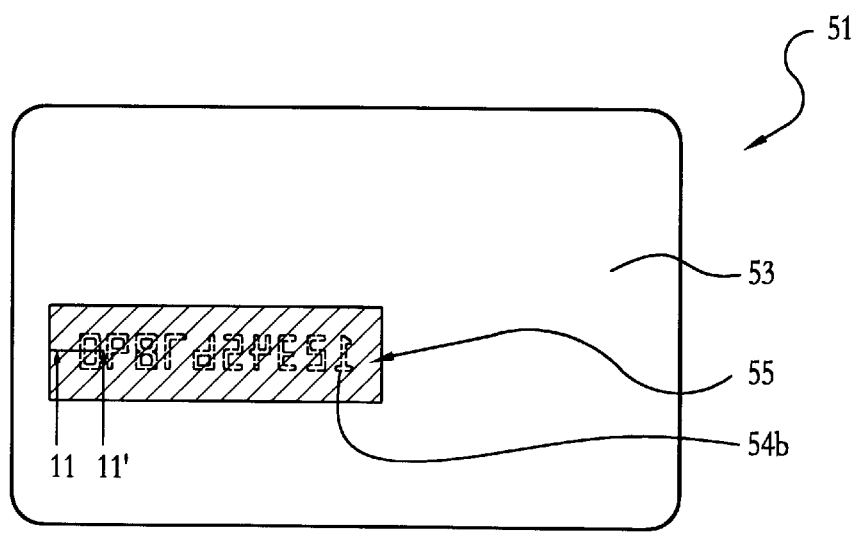
FIG. 10 is a view for describing the back of the card 51 shown in FIG. 9.

Thus, the interposing process simply increases as the process of manufacturing the card 11 as compared with the card having the structure of the first embodiment. Accordingly, the card 41 having a forgery-preventive structure and in which the degree of freedom of usage of the reverse side thereof has been improved, can be realized in accordance with a simple manufacturing process:

A third embodiment of the present invention will next be described. FIG. 9 is a view for describing the front surface of a card 51 showing the third embodiment of the present invention and having embossed patterns. FIG. 10 is a view for describing the back of the card 51. Although not shown in FIGS. 9 and 10, the card 51 may have means for magnetically recording information therein or means such as an integrated circuit having a memory, for recording information therein. However, the information recording means will be formed within a region other than a region in which embossed patterns to be described later are formed.

Referring to FIG. 9, embossed patterns 54 are formed on the front surface 52 of the card 51. Numeric characters are formed as the patterns 54 in FIG. 9. The patterns 54 on the front surface 52 are shaped in convex form. In FIG. 10, portions corresponding to the embossed patterns 54 of the reverse side 53 of the card 51 are shaped in concave form. A film 55 is affixed to a region for forming the concave-shaped portions in the reverse side 53. The film 55 has a thickness of such an extent as not to interfere with the use of the card 51. Accordingly, the film 55 may preferably be made thin. Further, the film 55 may be colorless and transparent but preferably be colored. This reason will be described later.

Figure 11:
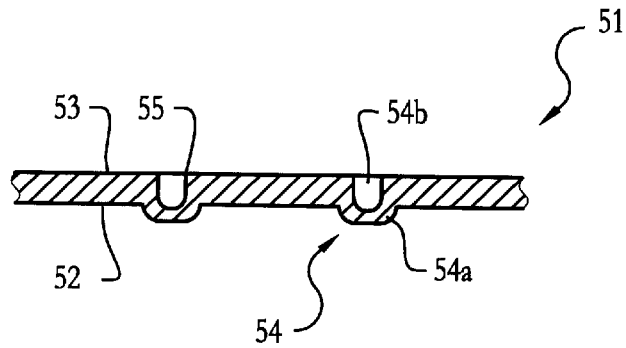
FIG. 11 is a cross-sectional view taken along line 11—11 of FIG. 10.

FIG. 11 is a cross-sectional view taken along line 11—11 of FIG. 10. Referring to FIG. 11, the structure of the above-described patterns is distinctly illustrated. The patterns 54 are formed as convex portions 54a on the front surface 52 side and are formed as concave portions 54b on the back 53 side. Further, the film 55 is affixed to the region for forming the concave portions 54b.

Now consider that when one attempts to counterfeit the patterns 54 embossed on the card 51 constructed in the above-described manner, the card 51 is pressed to flatten the front 52 and back 53 of the card 51. A press process for forging the embossed patterns 54 of the card 51 is often carried out under the normal heated state. Therefore, the film 55 is melted by this heating so as to be integral with the card 51. Thereafter, even if desired patterns are formed on the card 51 by embossing, no film 55 is affixed to a region for provision of the newly-formed patterns. Thus, whether or not the card 51 has been forged or imitated, can be immediately detected by confirming the state of the film placed in the region for the formation of the embossed patterns 54 from the reverse side 53 of the card 51. If the film 55 is particularly colored to provide easy visual confirmation, it is then possible to clearly find the film 55.

Further, if the film 55 is colored, then the color of the film 55 formed integrally with the card 51 by its melting enters the card 51. Thus, since the color of the film 55 extends into the back 53 of the card 51, it is possible to more definitely find out whether or not the card 51 has been forged.

A method of manufacturing the card 51 according to the third embodiment will now be described. Respective processes up to the formation of the patterns 54 embossed on the card base material are similar to those shown in FIGS. 4A through 4C. The film 55 is placed on the region for the formation of the patterns 54 embossed on the card 51 placed in the state shown in FIG. 4C. As a result, the fabrication of the card 51 is completed.

Thus, the process for affixing the film 55 to the region simply increases as the process of manufacturing the card 51. Accordingly, the card 51 having a forgery-preventive structure can be realized in accordance with a simple manufacturing process.

Further, if a thermosetting or thermochromic film is used as the film 55, then the same advantageous effect as when the thermosetting or thermochromic resin is charged into each concave portion defined in the card 11 in the first embodiment, can be obtained in addition to the above-described effect obtained in the second embodiment.

Although described in detail above, the present invention is not limited to the constructions and manufacturing methods according to the respective embodiments. Namely, various modifications can be made based on the scope or spirit of the present invention. Although the region for applying the film 55 is set as the concave-portion forming region in the third embodiment, the film 55 may be placed over the entire reverse side 53, for example. This can save trouble required to make alignment for placing the film 55 on a predetermined position alone. Since the entire reverse side is made integral with the film by the press process for forgery, a decision as to whether the card 51 has been forged, can be definitely made. It is also needless to say that the first, second and third embodiments can be utilized in combination. The combination of these embodiments can provide a card having higher reliability and a forgery-preventive structure.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A card medium comprising:
   a front including convex shaped embossed patterns thereon which protrude from said front of said card medium;
   a back opposite to said front;
   a plurality of concave portions, corresponding to said embossed patterns, formed in said back of said card medium; and
   a resin filled into each of said plurality of concave portions formed in said back of said card medium.

2. A card medium according to claim 1, wherein said back of said card medium is flattened by said resin filled into each of said plurality of concave portions.

3. A card medium according to claim 2, wherein said resin is a thermosetting resin.

4. A card medium according to claim 1, wherein said resin is a thermosetting resin.

5. A card medium according to claim 1, said resin defining a means for indicating tampering with said card medium by spreading out on said back of said card medium when said card medium, including said embossed patterns, is flattened.

6. A method of forming embossed convex shaped patterns which protrude from a front of a card medium, comprising:
   disposing the card medium between a concave mold corresponding to the embossed convex shaped patterns to be formed and a convex mold disposed in an opposing relationship to the concave mold;
   embossing the card medium with the concave and convex molds so as to define a plurality of convex portions which protrude from the front of the card medium and concave portions in a back of the card medium corresponding to the embossing patterns; and
   filling a resin into each of the plurality of concave portions defined in the back of the card medium by said step of embossing so as to flatten the back portion of the card medium and so as to leave the plurality of convex portions as embossed convex shaped patterns which protrude from the front of the card medium.

7. A method according to claim 6, wherein the resin is a thermosetting resin.

8. A method according to claim 6, wherein said embossing is executed substantially simultaneously with said filling of the resin into each of the plurality of concave portions.

9. A method according to claim 6, wherein said embossing is performed substantially simultaneously with said filling of the resin into each of the plurality of concave portions.

10. A card medium comprising:
- a front including convex shaped embossed patterns thereon which protrude from said front of said card medium;
- a back opposite to said front;
- a plurality of concave portions, corresponding to said embossed patterns, formed in said back of said card medium; and
- a film placed on part of said back so as to cover said plurality of concave portions formed in said back of said card medium and so as to flatten said back of said card medium.

11. A card medium according to claim 10, wherein said film is a color film.

12. A card medium according to claim 11, wherein said film is heat-fusible.

13. A card medium according to claim 12, wherein said film is substantially thinner than a thickness of said card medium without said film, such that a combined thickness of said card medium with said film is substantially the same as the thickness of said card medium without said film.

14. A card medium according to claim 11, wherein said film is substantially thinner than a thickness of said card medium without said film, such that a combined thickness of said card medium with said film is substantially the same as the thickness of said card medium without said film.

15. A card medium according to claim 10, wherein said film is heat-fusible.

16. A card medium according to claim 10, wherein said film is substantially thinner than a thickness of said card medium without said film, such that a combined thickness of said card medium with said film is substantially the same as the thickness of said card medium without said film.

17. A card medium according to claim 10, said film defining a means for indicating tampering by melting and becoming integral with said card medium when said card medium, including said embossed patterns, is heated and flattened.

* * * * *